United States Patent [19]

Townley

[11] Patent Number: 5,428,640
[45] Date of Patent: Jun. 27, 1995

[54] SWITCH CIRCUIT FOR SETTING AND SIGNALING A VOLTAGE LEVEL

[75] Inventor: Alfred T. Townley, Maynard, Mass.

[73] Assignee: Digital Equipment Corporation, Maynard, Md.

[21] Appl. No.: 965,123

[22] Filed: Oct. 22, 1992

[51] Int. Cl.⁶ .................. A61B 5/044; H04B 3/46
[52] U.S. Cl. .................. 375/257; 375/295; 128/706; 128/710
[58] Field of Search ........... 128/668, 695, 696, 706, 128/710, 901; 375/59, 75, 36; 455/39, 49.1, 53.1, 66

[56] References Cited

U.S. PATENT DOCUMENTS

| | | | |
|---|---|---|---|
| 3,938,507 | 2/1976 | Sarnoff et al. | 128/706 |
| 4,221,223 | 9/1980 | Linden | 128/706 |
| 4,230,127 | 10/1980 | Larson | 128/706 |
| 5,263,049 | 11/1993 | Wincn et al. | 375/36 |

Primary Examiner—Willis R. Wolfe
Attorney, Agent, or Firm—Denis G. Maloney; Arthur W. Fisher

[57] ABSTRACT

A switch circuit is disclosed which both sets the voltage at an output terminal and signals that the voltage has been set. The switch circuit may be implemented with a single-pole single-throw switch. A voltage drop device, connected in parallel with the switch, is used to generate the output voltage levels. The switch circuit is also suitable for enabling and disabling the heartbeat signal generated by a local area network transceiver and for signaling whether the heartbeat signal has been enabled by lighting a light-emitting diode.

6 Claims, 3 Drawing Sheets

SWITCH CIRCUIT FOR SETTING AND SIGNALING A VOLTAGE LEVEL

FIELD OF THE INVENTION

This invention relates to a circuit using a switch to produce an output voltage and to signal that the voltage is being produced.

BACKGROUND OF THE INVENTION

Local area networks are commonly used to allow multiple computing devices to communicate over distances. Examples of local area networks are networks which comply with the ANSI/IEEE 802.3 standard. Such networks use transceivers to interface between the computing device, such as a host computer, and the local area network medium, such as a coaxial cable.

Transceivers commonly communicate with the host computer via three differential signals: data-in, date-out, and collision. Messages that the transceiver receives from the network medium are supplied to the host computer via data-in, and data-out is asserted by the host computer to transmit messages. The collision signal is asserted by the transceiver when a collision between multiple messages is detected on the network medium. However, the collision signal may also be asserted as an acknowledgement that the transceiver has received a data-out signal from the host computer and has transmitted the message on the network medium. This acknowledgment is known as a heartbeat. Timing specifications insure that collision signals occurring within 1.0 μsec of the end of a transmission are heartbeats, while later collision signals result from the detection of data collisions on the network medium.

In some cases, the host computer is remote from the transceiver, requiring the use of one or more repeaters to boost signals sent between the host computer and the transceiver. Local area network specifications, such as ANSI/IEEE 802.3, however, prohibit the use of heartbeat signals when repeaters are employed. Thus, the transceiver must provide a method of enabling or disabling the heartbeat transmissions to the host computer depending on the presence of repeaters.

The enabling and disabling of the heartbeat transmissions is typically done by controlling the voltage at an input of the transceiver, known as the heartbeat enable input. The transmission of heartbeats is typically enabled when this input is held above a voltage threshold, and disabled when the input is held below a threshold. In addition, a light-emitting diode is sometimes turned on and off in conjunction with the heartbeat enable signal so that a user may easily observe the state of the transceiver. The light-emitting diode is typically lit when the heartbeat is enabled, and unlit when the heartbeat is disabled.

The control of the heartbeat enable signal, in conjunction with the lighting of the light-emitting diode, is typically performed by a circuit containing a single-pole double-throw switch. In its first position, the switch completes an electrical path between differential supply voltages which includes a series light-emitting diode. In this position, the switch also allows the heartbeat enable input on the transceiver to be pulled up to a voltage above a voltage threshold. Thus, in its first position, the single-pole double-throw switch enables the heartbeat and lights the light-emitting diode. In the second position, the switch typically clamps the heartbeat enable input below a voltage threshold and breaks the series circuit containing the light-emitting diode. This turns the light-emitting diode off and disables the transmission of heartbeat signals by the transceiver. While effective, the use of a single-pole double-throw switch exceeds the cost of simpler switches.

It is desirable, therefore, to have a simple and inexpensive circuit which is suitable for controlling the heartbeat enable signal supplied to a transceiver. It is also desirable that the circuit simultaneously activate a light-emitting diode or other signaling device when the heartbeat signal is enabled. Further, it is desirable that the circuit operate using a simple and inexpensive single-pole single-throw switch.

SUMMARY OF THE INVENTION

In a broad sense, the invention is a circuit for producing an output voltage, using a device for producing a voltage drop, from two reference voltages. When a switch is in a non-conductive state, the output voltage is high, exceeding the lower of the reference voltages by at least the voltage drop. When the switch is in a conductive state, the output voltage is lower than the high output voltage by the voltage drop.

In a narrow sense, the invention relates to a circuit for selectively enabling the production of a heartbeat signal by a local area network transceiver, and lighting a light-emitting diode when the heartbeat signal is enabled, in response to a single-pole single-throw switch.

DETAILED DESCRIPTION OF THE PREFERRED EMBODIMENT

Figure 1:
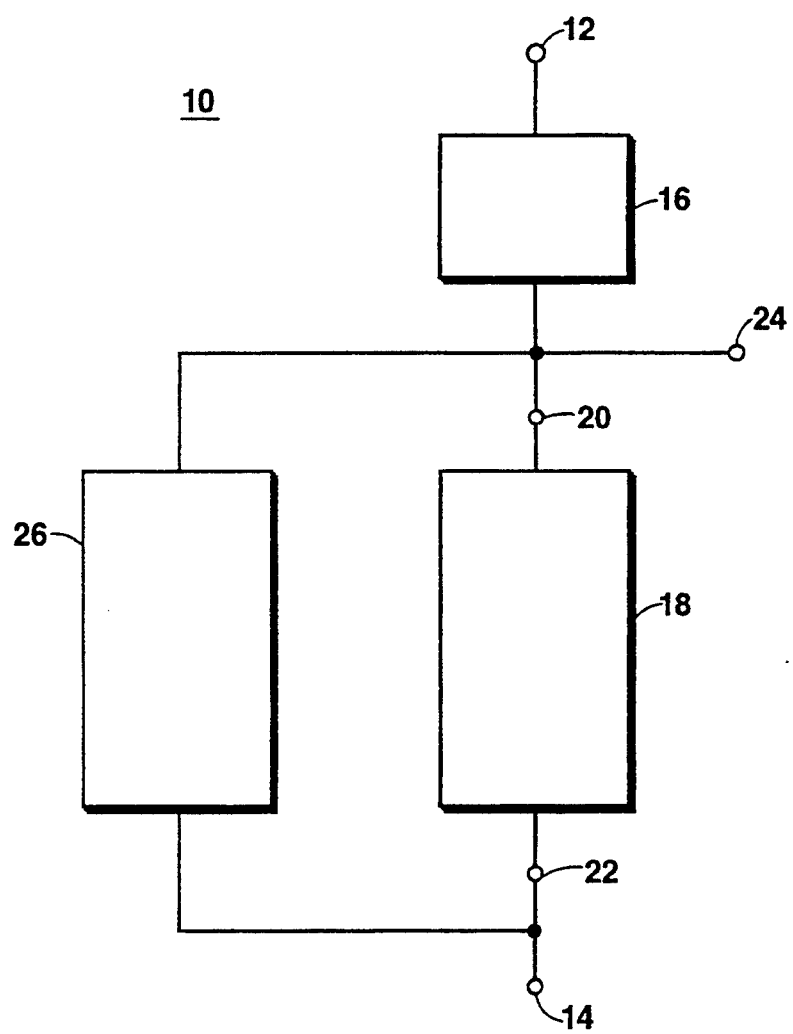
FIG. 1 is a block diagram of a circuit according to the invention.

FIG. 1 shows a block diagram of a switch circuit 10 for setting and signaling a voltage level. The switch circuit 10 is coupled to high and low reference voltage terminals 12 and 14, which are supplied by reference voltages by reference voltage sources (not shown.) As shown, the voltage at the high reference voltage terminal 12 exceeds the voltage at the low reference voltage terminal 14. The principles of the invention impose no restrictions on the absolute values of the reference voltages. However, the voltage at the high reference voltage terminal 12 must exceed the voltage at the low reference voltage terminal 14 by a specified voltage differential. The significance of this voltage differential will be discussed presently.

Coupled in series between the two reference voltage terminals 12 and 14 are a resistive element 16 and a voltage drop element 18, as shown. The voltage drop element 18 has high and low voltage terminals 20 and 22 and produces a specified voltage drop across these terminals 20 and 22 when current flows through the voltage drop element 18. As shown, the high voltage terminal 20 is coupled to the resistive element 16 while the low voltage terminal 22 is coupled to the low reference voltage terminal 14.

An output voltage terminal 24 is coupled to the high voltage terminal 20 of the voltage drop element 18. It is at this output voltage terminal 24 that the switch circuit 10 sets the voltage level.

FIG. 1 also shows a switching element 26 coupled across the voltage drop element 18. This switching element 26, responsive to an external stimulus (not shown,) selectively shunts current around the voltage drop element 18 and may create a short circuit across the voltage drop element 18.

During operation of the switch circuit 10 shown in FIG. 1, the switching element 26 may serve as an open circuit or as a short circuit, depending on the demands of an external stimulus. During periods when the switching element 26 is an open circuit, the voltage asserted at the output voltage terminal 24 is approximately equal to the voltage of the low reference voltage terminal 14 plus the specified voltage drop created by the voltage drop element 18. This is the case so Long as the voltage differential between the high and low reference voltage terminals 12 and 14 exceed the specified voltage drop. The voltage drop element 18 may use the power supplied to it for various purposes, such as signaling that switching element 26 is non-conductive and that a particular voltage is being asserted on the output voltage terminal 24. This signaling may be done audibly, visually, electronically, or by other means.

During periods when the switching element 26 is conductive, serving as a short circuit, the voltage drop element 18 is electrically bypassed. Thus, no power is supplied to the voltage drop element 18, and the voltage drop element 18 ceases any signaling that it had previously asserted. During these periods, the output voltage terminal 24 is clamped to the voltage of the low reference voltage terminal 14. The resistive element 16 serves to limit the current conducted between the high and low reference voltage terminals 12 and 14.

In sum, when the switching element 26 is non-conductive, it causes a voltage equal to that of the low reference voltage terminal 14 plus the specified voltage drop to be asserted at the output voltage terminal 24 and, simultaneously, cause the voltage drop element 18 to signal the assertion of this voltage. In its conductive state, the switching element 26 applies the voltage of the low reference voltage terminal 14 to the output voltage terminal 24 while removing the power supplied to the voltage drop element 18, ceasing any signaling by the voltage drop element 18.

Figure 2:
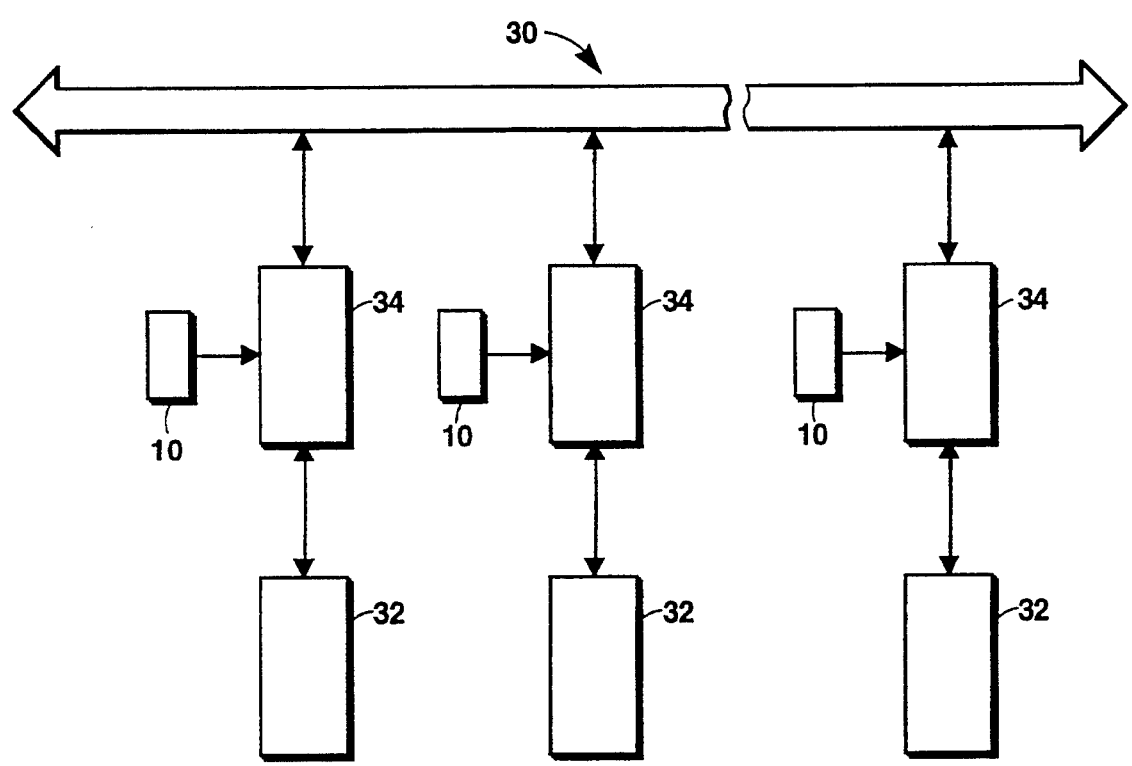
FIG. 2 is a block diagram of a local area network environment including multiple pairs of computing devices and transceivers in conjunction with a circuit according to the invention.

FIG. 2 shows an embodiment of the switch circuit 10 in conjunction with a local area network 30. The local area network 30 shown allows communication among three computing devices, embodied as host computers 32. A transceiver element 34 serves as an interface between each host computer 32 and the local area network 30. A switch circuit 10 is shown to be coupled to each transceiver element 34.

Figure 3:
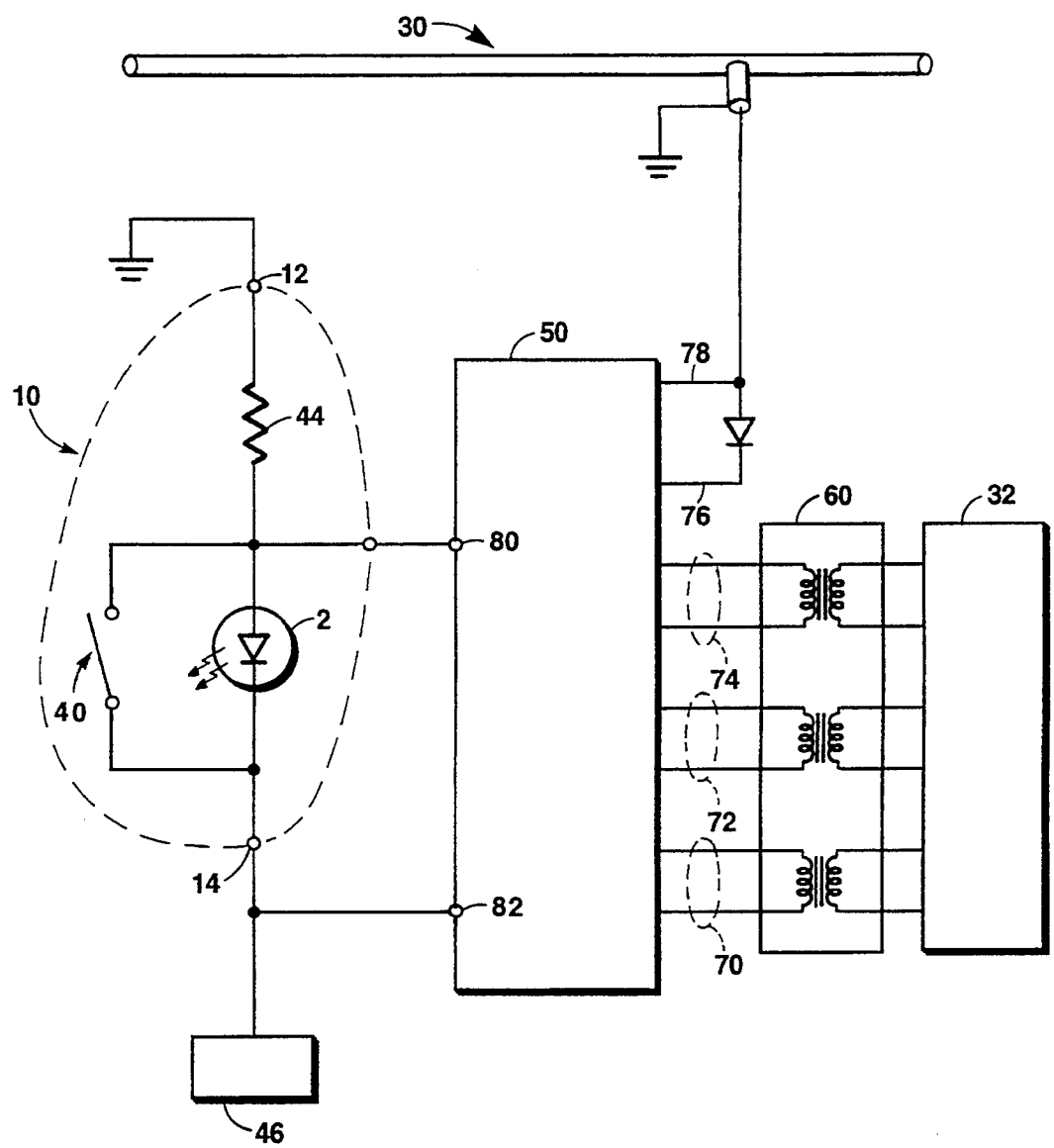
FIG. 3 is a schematic diagram of an embodiment of the block diagram of FIG. 1 in the local area network environment of FIG. 2.

FIG. 3 shows a discrete embodiment of the switch circuit 10 within the environment of the local area network 30 of FIG. 2. The switching element 26 is embodied as a single-pole single-throw switch 40, the voltage drop element 18 is embodied as a light-emitting diode 42, and the resistive element 16 is embodied as a resistor 44. The transceiver element 34 is also embodied as a transceiver 50. However, the switch 40 may alternatively be embodied as a transistor or other device which controls the electrical conductivity between two terminals. As shown, the high reference voltage terminal 12 is coupled to ground and the low reference voltage terminal 14 is coupled to a low reference voltage source 46. In the embodiment shown, the low reference voltage source 46 supplies a low reference voltage of −9 volts.

The transceiver 50 shown in FIG. 3 is embodied as a National Semiconductor 8392 coaxial transceiver interface. However, any discrete or integrated circuit serving as a local area network transceiver may be used. The transceiver 50 communicates with the host computer 32, through an isolation transformer 60, via three signals, each signal being transmitted as a differential pair 70, 72, and 74. These differential pairs are the transmit pair 70, the receive pair 72, and the collision pair 74.

When the host computer 32 sends a message via the transmit pair 70 to the transceiver 50, the transceiver 50 responds by encoding the message on a transmit line 76. The transmit line 76 allows the transceiver to transmit the message over the local area network 30. The transceiver 50 also detects messages on the local area network 30 by monitoring a receive line 78. When the transceiver 50 detects a message on the receive line 78, the transceiver 50 forwards the message to the host computer 32 via the receive pair 72.

The collision pair 74 is used in two ways. First, the transceiver 50 asserts a collision signal on the collision pair 74 whenever the transceiver 50 detects a data collision on the local area network 30. This alerts the host computer 32 that data collisions are occurring. Second, the transceiver may also assert an acknowledgment signal on the collision pair 74 in response to a transmission by the host computer 32 on the transmit pair 70. This acknowledgment signal informs the host computer 32 that its message sent on the transmit pair 70 was successfully received by the transceiver 50. However, this acknowledgment signal, known as a heartbeat, must sometimes be disabled. This is the case where the local area network 30 conforms to ANSI/IEEE 802.3 standards and where one or more repeaters (not shown) are included between the host computer 32 and the transceiver 50.

In the embodiment shown, the heartbeat is enabled when the heartbeat enable input 80 of the transceiver exceeds a voltage threshold. In the case of the National Semiconductor 8392 coaxial transceiver interface, this threshold is 1.4 volts above the voltage of the VEE input 82. The heartbeat is disabled when heartbeat enable input 80 is held to less than or equal to 0.4 volts above the voltage of the VEE input 82. In FIG. 3, both the VEE input 82 and the low reference voltage terminal 14 are tied to −9.0 volts.

In accordance with the principles described in reference to FIG. 1, the switch circuit 10 controls voltage of the heartbeat enable input 80 of the transceiver 50 and the lighting of the light-emitting diode 42 with a single-pole single-throw switch 40. When the switch 40 is closed, the terminals of the light-emitting diode 42 are effectively shorted together and there is no voltage drop across the light-emitting diode 42. This causes the light-emitting diode 42 to be unlit. Without a voltage drop across the light-emitting diode 42, the voltage of the heartbeat enable input 80 is approximately equal to the voltage of the low reference voltage source 46, which is −9.0 volts in the embodiment of FIG. 3. As described above, the threshold for disabling the heartbeat signal is approximately the voltage of the VEE input 82 plus 0.4 volts, or −8.6 volts. Thus, the heartbeat signal is effectively disabled with a heartbeat enable input voltage of −9.0 volts, which is well below the disable threshold of −8.6 volts. In the closed position, therefore, the switch 40 both disables the heartbeat signal and maintains the light-emitting diode 42 in an unlit condition.

When the switch 40 is open, the terminals of the light-emitting diode 42 are not shorted together and the light-emitting diode 42 is lit. Further, the voltage drop created by the light-emitting diode 42 causes the voltage of the heartbeat enable input 80 to exceed the voltage of the low reference voltage source 46 by the magnitude of this voltage drop. In the embodiment shown, the light-emitting diode voltage drop is approximately 2.0 volts, which results in a heartbeat enable input voltage of approximately −7.0 volts. As described, the threshold for insuring that the heartbeat signal is enabled is approximately the voltage of the VEE input 82 plus 1.4 volts, or −7.6 volts. Thus, the heartbeat signal is effectively enabled with a heartbeat enable input voltage of −7.0 volts, which is well above the enable threshold of −7.6 volts. In the open position, therefore, the switch 40 both enables the heartbeat signal and maintains the light-emitting diode 42 in a lit condition.

Because the switch circuit 10 operates on the differential voltage between the reference voltage terminals 12 and 14, there is no particular restriction on the magnitude of voltages supplied to these terminals. However, the voltage of the high reference voltage terminal 12 must exceed the voltage of the low reference voltage terminal 14 by at least the voltage drop of the light-emitting diode 42. Further, as long as this restriction is met, the voltages at the reference voltage terminals 12 and 14 need not be fixed, and may vary in time. As a result, the voltage at the output voltage terminal 24 will track the voltage of the low reference voltage terminal 14 when the switch 40 is closed, and the light-emitting diode 42 will remain off. Similarly, the voltage of the output voltage terminal 24 will consistently exceed the time-varying voltage of the low reference voltage terminal 14 by the specified voltage drop as long as the switch 40 is open, and the light-emitting diode 42 will remain on.

While specific embodiments of the invention have been shown and described in detail to illustrate the application of the invention principles, it will be apparent that the invention may be embodied otherwise without deviating form the invention set forth in the following claims.

What is claimed is:

1. A heartbeat enable circuit comprising:
   means for producing a first reference voltage;
   a light-emitting diode having anode and cathode terminals producing a specified voltage drop, the anode terminal being coupled to the means for producing a first reference voltage and providing a heartbeat enable signal, the heartbeat enable signal having high and low states;
   means for producing a second reference voltage, the second reference voltage being lower than the first reference voltage by at least the specified voltage drop and being coupled to the cathode terminal of the light-emitting diode;
   a switch coupled in parallel with the light-emitting diode having conductive and non-conductive states, the heartbeat enable signal being maintained at its high state which exceeds the second reference voltage by at least the specified voltage drop when the switch is in the non-conductive state and being maintained at its low state which is less than the voltage of its high state by the specified voltage drop when the switch is in the conductive state; and
   a transceiver responsive to the heartbeat enable signal, the transceiver producing a heartbeat signal and the light-emitting diode being lit responsive to a high heartbeat enable signal, the heartbeat signal being inhibited and the light-emitting diode being unlit responsive to a low heartbeat enable signal.

2. The heartbeat enable circuit of claim 1 wherein the switch comprises a single-pole single-throw switch.

3. The heartbeat enable circuit of claim 1 wherein the first reference voltage is approximately at ground and the second reference voltage is at approximately −9 volts.

4. The heartbeat enable circuit of claim 1 further comprising a series resistance having two terminals, one series resistance terminal being coupled to the means for producing a first reference voltage and the other series resistance terminal being coupled to the anode of the light-emitting diode.

5. The heartbeat enable circuit of claim 1 wherein the specified voltage drop is approximately 2 volts.

6. The heartbeat enable circuit of claim 1 wherein the transceiver comprises a coaxial transceiver interface integrated circuit coupled to a local area network compliant with ANSI/IEEE 802.3.

* * * * *